(No Model.) 2 Sheets—Sheet 1.

E. A. SPERRY.
POWER TRANSMITTING MECHANISM.

No. 562,498. Patented June 23, 1896.

WITNESSES.
A. H. Abell.
A. F. Macdonald.

INVENTOR.
Elmer A. Sperry,
by Geo. R. Blodgett,
Atty.

(No Model.) 2 Sheets—Sheet 2.

E. A. SPERRY.
POWER TRANSMITTING MECHANISM.

No. 562,498. Patented June 23, 1896.

WITNESSES.
A. H. Abell.
A. F. Macdonald.

INVENTOR.
Elmer A. Sperry, by
Geo. R. Blodgett,
atty.

UNITED STATES PATENT OFFICE.

ELMER A. SPERRY, OF CLEVELAND, OHIO, ASSIGNOR, BY MESNE ASSIGNMENTS, TO THE GENERAL ELECTRIC COMPANY, OF NEW YORK.

POWER-TRANSMITTING MECHANISM.

SPECIFICATION forming part of Letters Patent No. 562,498, dated June 23, 1896.

Application filed January 30, 1894. Serial No. 498,510. (No model.)

*To all whom it may concern:*

Be it known that I, ELMER A. SPERRY, a citizen of the United States, residing at Cleveland, Cuyahoga county, Ohio, have invented certain new and useful Improvements in Power-Transmitting Mechanism, of which the following is a full, clear, and exact description.

Figure 1:
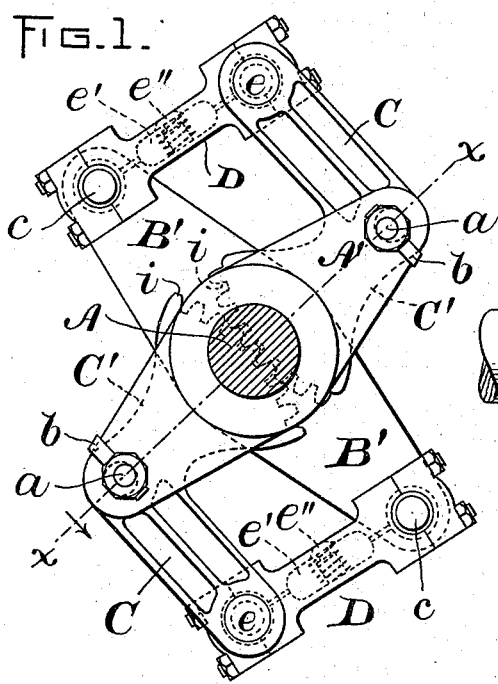
Figure 2:
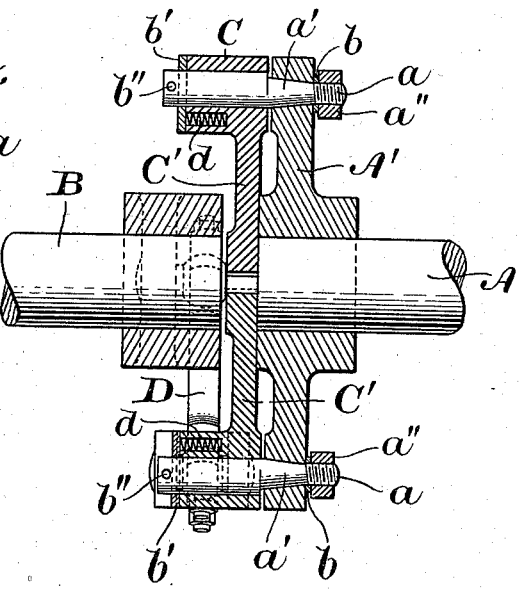
Figure 3:
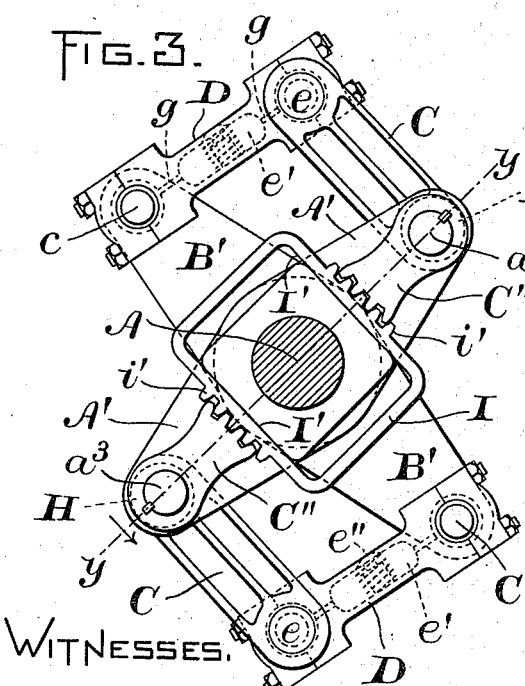
Figure 4:
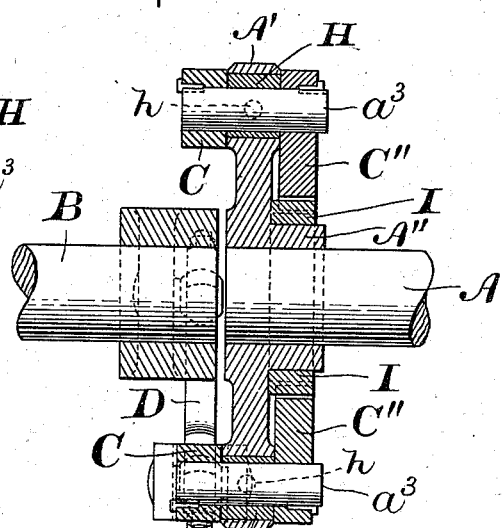
Figure 5:
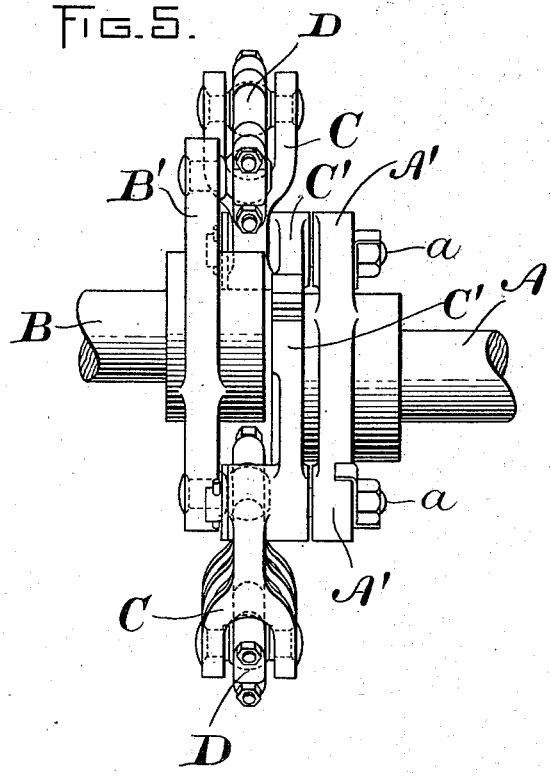
Figure 6:
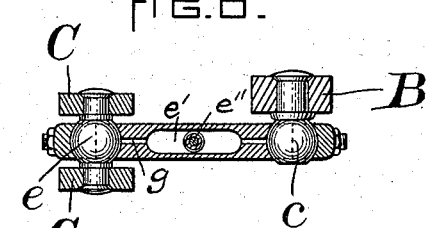
Figure 7:
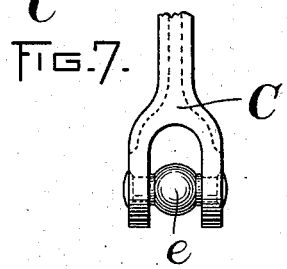
Figure 8:
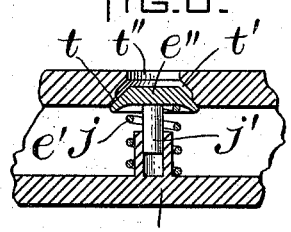
Figure 9:
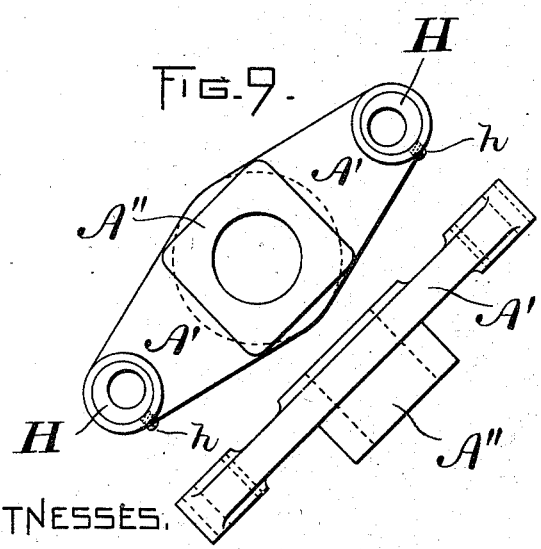
Figure 10:
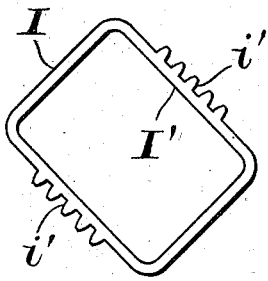

My invention relates to power-transmitting mechanism; and it consists in a novel arrangement of links which allows of eccentric and other changes in alinement of the axis of two revolving parts while not interfering with the transmission of power between them.
The present application constitutes an improvement in mechanism shown in my application, Serial No. 490,696, bearing the date November 11, 1893. This is illustrated in the accompanying drawings, in which—
Figure 1 is an elevation. Fig. 2 is a sectional view, line $x\ x$, Fig. 1. Fig. 3 is an elevation in modified form; Fig. 4, a sectional view of same, taken on line $y\ y$, Fig. 3. Fig. 5 is a side view. Fig. 6 is a longitudinal section of one of the connecting-rods. Fig. 7 is a detail view of one end of a bell-crank link. Fig. 8 is a section of a valve in the connecting-rod. Fig. 9 shows the cross-arm used in Fig. 3. Fig. 10 shows the yoke used in Fig. 3.
Similar letters of reference indicate like parts throughout.

On the ends of the shafts A B are mounted hubs, each carrying driving cross-arms A' B', the arms on one hub being preferably normally disposed practically at right angles to those on the other, although they may be at an angle of any substantial magnitude from each other. At or near each end of the cross-arm A' is a cylindrical wrist-pin $a$, having a conical portion $a'$, fitting a conical hole in the arm and arranged eccentric to the cylindrical portion, and being secured by a nut $a^2$, furnished with a nut-locking device $b$. At one extremity of this pin is a washer $b'$, with its retaining-pin $b^2$ passing transversely through or into the pin $a$. On the extremities of the other cross-arm B' are wrist-pins $c\ c$, the projecting portions of which are spherical, as shown in Figs. 5 and 6. Upon the pins $a$ are pivoted the bell-crank links C C, provided with springs $d\ d$, which push outward against the collars $b'$, forcing the links back toward the cross-arm A'. The links, however, do not bear at the shoulder around the pin $a$; but their arms C' are pressed by the springs against the end of the shaft A. The adjacent ends of these arms are formed with segment-gears which intermesh, the teeth being indicated at $i$, as shown in elevation partly dotted in Fig. 1. The friction between these parts and the shaft A is found to effectually prevent the rattle and ring of the overhanging parts. The outer extremity of the link C is bifurcated, and spanning the fork is a pin $e$, firmly secured in the arms of the link and having its middle portion shaped spherically, as shown in Fig. 7. Connecting these spherical pins $e$ and the spherical pins $c$ on the cross-arm B' are rods D, provided with suitable ball-sockets at each end to fit upon said pins.

Sufficient space is left between the sides of the rod D and the arms of the forks of the links C to allow the rods to have free rolling movement in every direction on the pins $e$, as indicated in Fig. 6. This is to allow the shafts A and B to change distances from each other in a longitudinal direction, and also allow of the roll of the rod D whenever such roll becomes necessary. An oil-cavity $e'$ is shown in each of these links, the inlet-aperture of which is closed by a valve $e''$, (illustrated in Fig. 8, where an enlarged view is shown,) the valve being supported by spring $j$ and guided by stem $j'$. A contracted valve-seat is indicated at $t$ with a long clearance-space $t'$ from the outside aperture $t^2$ of the oiling-hole, the object of the clearance being to avoid any imperfection in the seating of the valve owing to the abrasion of the edges of the hole $t''$. Oilways $g\ g$ are shown leading from the oil-cavity $e'$ to each pin-bearing. Where it is necessary that the two shafts A and B work in close proximity to each other, the inward projections C' of the links are transferred to the back side of the cross-arm A', as shown at C'', Figs. 3 and 4, the pin $a^3$ in this case being a short rock-shaft rotating within an eccentric bushing H, being secured by a set-screw $h$, (shown in dotted lines in Fig. 4,) each of the arms C and C'' being securely keyed to the pin $a^3$. The purpose of the eccentricity in the pin $a$ and the bushing H is to take up wear in the gear-teeth, and further for the purpose of establishing equilibrium in the revolving parts attached to the shaft A. The rearward projection of the hub $A''$ of the cross-arm $A'$ is square, as indicated in Figs. 9 and 3, and is provided with a rectangular framework I, the internal faces of which (indicated at $I'$) are machined so as to fit the exterior-faced portion of the hub, and are provided on the exterior with teeth forming a rack (indicated by $i'\ i'$) coöperating with the teeth in the arms $C''\ C''$, forming a transmitting device between the two systems of links on the opposite ends of the cross-arm $A'$, and constituting a medium for transmitting the strains around the shaft A and the hub $A''$.

The use and operation of the device will be readily understood from the drawings. The intermeshing teeth $i$, Fig. 1, serve in lieu of the equalizer shown in the former application above referred to, equalizing the strains at the pins $e$, which are at all times opposite and substantially at equal distances from the shaft A, allowing the shafts A and B to run while in eccentric relation to each other, under which conditions the gear-faces $i\ i$, Fig. 1, or $i'\ i'$, Fig. 3, constantly rock back and forth in degree proportionate to the amount of the eccentricity of said shafts A and B. The modifications shown in Figs. 3 and 4 perform like functions without occupying space between the two shafts, allowing them to come close together. This is used where the device is required to operate in a contracted space along the axis. The ball-bearings at $c\ c$ and $e\ e$ on the opposite extremities of the rods D D allow of a deflection of the shafts also as to their parallelism, all of which will be readily understood.

It will be readily understood that the pivots at point $e\ e$ could be cylindrical and still allow the device to work within reasonable limits of deflection as to the shafts A B, and other modifications could be made in the details without departing from the spirit of the invention.

I do not claim herein anything shown or described in my pending applications, Serial Nos. 464,651 and 498,510, each of which covers subject-matter specifically different from the present invention.

Having thus described my invention, what I claim is—

1. The combination with two abutting shafts, of a cross-arm on each shaft, bell-crank links pivoted at the outer ends of one of said cross-arms and having arms provided with connected segment-gears, spherical pins on the ends of the other arms of said links, spherical wrist-pins on the other cross-arm, and rods connecting said links and cross-arm having spherical bearings fitting said pins, substantially as described.

2. The combination with two abutting shafts, of a cross-arm on each shaft, pins mounted eccentrically in the ends of one of said arms, bell-crank levers pivoted on said pins and connected with the other cross-arm, and means for connecting the bell-crank levers so that they operate in unison, substantially as described.

3. The combination with two abutting shafts, of a cross-arm on each shaft, wrist-pins having conical eccentric ends fitting conical holes in one of said arms, bell-crank levers pivoted on said pins and connected with the other cross-arm, and gear-teeth connecting the adjacent ends of the bell-crank levers, substantially as described.

4. The combination with two abutting shafts, of a cross-arm on each shaft, bell-crank levers pivoted on the ends of one of said cross-arms, and having intermeshing segment-gears meeting between the ends of the shafts, means for pressing said geared portions of the levers against the end of one of said shafts, and connections between said levers and the other cross-arm, substantially as described.

5. The combination with two abutting shafts, of a cross-arm on each shaft, wrist-pins at the ends of one of said cross-arms, washers on the outer ends of the pins, bell-crank levers pivoted on the pins and having intermeshing segment-gears meeting between the ends of the shafts, springs abutting against the washers and pressing the levers against the end of one of said shafts, and connections between said levers and the other cross-arm, substantially as described.

ELMER A. SPERRY.

Witnesses:
C. A. LONGFELLOW,
E. P. BITZER.